United States Patent [19]

Buell

[11] Patent Number: 4,488,761
[45] Date of Patent: Dec. 18, 1984

[54] WHEEL DISC BRAKE

[75] Inventor: Erik F. Buell, Milwaukee, Wis.

[73] Assignee: Harley-Davidson Motor Co., Inc., Milwaukee, Wis.

[21] Appl. No.: 376,533

[22] Filed: May 10, 1982

[51] Int. Cl.³ .......................... B60B 3/02; B60B 3/14; B60B 3/16

[52] U.S. Cl. .................. 301/6 E; 301/6 R; 301/6 V; 301/63 DD; 188/72.5; 188/344

[58] Field of Search ................. 301/6 E, 6 V, 63 DD, 301/65, 6 R, 63 R; 188/24.13, 344, 72.5

[56] References Cited

U.S. PATENT DOCUMENTS

| 3,446,536 | 5/1969 | Sutowski | 301/63 DD |
| 3,709,561 | 1/1973 | De Biasse et al. | 301/6 V X |
| 3,782,778 | 1/1974 | Tomozawa | 301/63 DD |
| 4,049,090 | 9/1977 | Buell | 188/251 M |

FOREIGN PATENT DOCUMENTS

| 1189877 | 3/1965 | Fed. Rep. of Germany | 188/72.5 |
| 344799 | 11/1936 | Italy | 188/344 |
| 351735 | 7/1931 | United Kingdom | 301/63 DD |
| 985349 | 3/1965 | United Kingdom | 301/63 DD |
| 1405676 | 9/1975 | United Kingdom | 188/344 |

Primary Examiner—David A. Scherbel

[57] ABSTRACT

In a combined wheel-disc assembly, the wheel disc surface is used as a brake rotor. The need for a separate disc rotor is eliminated and the assembly provides a large area for brake contact and desirable air cooling of the braking surface. Braking forces are balanced in the disclosed assembly. Holes may be provided in the wheel disc to increase air circulation.

7 Claims, 3 Drawing Figures

WHEEL DISC BRAKE

BACKGROUND OF THE INVENTION

A. Field of the Invention

The present invention relates generally to wheel and brake assemblies and more particularly to an assembly in which the wheel disc surface is employed as and in place of a conventional brake rotor. Still more particularly, the present invention relates to a wheel disc brake assembly for use with motorcycles or other vehicles.

B. Description of the Prior Art

The prior art will be described by reference to motorcycles, but it should be understood at the outset that the present invention may be used with other types of vehicles, such as automobiles, aircraft, bicycles and the like.

In a typical motorcycle wheel assembly, a plurality of spokes interconnect the hub and a flanged rim. The tire is mounted on the rim and a separate disc brake rotor is mounted adjacent the hub. A brake caliper is provided for applying frictional braking forces against the rotor to stop the motorcycle.

Several problems are inherent in the design of such motorcycle wheel assemblies. First, construction of a spoked wheel assembly requires a great deal of care to insure that the wheel is maintained in a round configuration. Many prior art systems include movable spokes to compensate for changes in the weight loading on the wheel as it rotates. Such wheel assemblies are subjected to a great variety of complex stress forces during cornering. A further problem results from the fact that braking forces are applied to the brake rotor in the central portion of the wheel, which in turn must be transmitted through the spokes to the rim and tire before the motorcycle can be stopped. Moreover, by employing a small disc rotor near the hub, the braking surface is quite small and air cooling thereof is reduced.

Several of these problems have been recognized in the prior art and various attempts have been made to overcome them. One such prior art attempt is described in the Blasse et al. U.S. Pat. No. 3,709,561 issued Jan. 9, 1973 for "Brake and Wheel Assembly for Motorcycles and the Like." The wheel assembly described in this patent includes a hub and flanged rim with a plurality of rigid spokes coupling them together. The spokes have an I-shaped cross-section and are tapered slightly as they extend to the wheel periphery. The patent indicates that the rigid, but lighweight, construction of the spokes, maintains the desired roundness and supports the wheel during rotation, turning and braking. The brake system employed in the Blasse et al. device includes an annular brake ring bolted or otherwise suitably attached to the rim. The ring can be attached to the right or left side of the rim. Braking forces are applied from a brake caliper attached to the motorcycle frame. The patent states that the use of the rim mounted brake ring increases the cooling of the braking surface, provides a larger area of braking surface and results in the braking forces being applied directly to the rim rather than being applied to the hub and transmitted to the rim through the spokes.

While not related to the preparation of a wheel assembly for a motorcycle, one additional piece of prior art will be described here, i.e. the present inventor's U.S. Pat. No. 4,049,090 issued Sept. 20, 1977 for "Brake Discs." The patent relates to a brake disc rotor of conventional shape and utility having reduced weight and improved thermal dissipation. The disc brake rotor configuration described in the patent includes an aluminum core with stainless steel sheets bonded on each side to form an integral disc. The disc includes a central apperture for surrounding the hub and a plurality of circumferentially located holes about the apperture for attaching the rotor to a brake spider as is known to the motorcycle art.

The prior art has yet to disclose a braking system and wheel assembly which overcomes all the above-noted disadvantages of the prior art. A system which does so would represent a significant advance in this art.

OBJECTS AND SUMMARY OF THE INVENTION

It is a primary object of the present invention to provide a wheel and brake assembly which overcomes the aforementioned disadvantages of the prior art.

Another object of the present invention is to provide a wheel and brake assembly which has improved rigidity and structural integrity.

A further object of the present invention is to provide a wheel and brake assembly which has a large braking surface and in which the braking surface is located near the rim of the wheel assembly.

A still further object of the present invention is to provide a wheel and brake assembly which provides improved cooling of the brake surface.

A difference object of the present is to provide a wheel and brake assembly which requires fewer parts than the above-mentioned prior art wheel and brake assemblies.

Yet another object of the present invention is to provide a wheel and brake assembly which allows torque created by brake application force to be balanced by the frictioned force torque about the wheel support member.

How these and other objects of the present invention are accomplished will be described in the following description of the preferred embodiment, taken in conjunction with the FIGURES. Generally, however, the objects are accomplished by providing a wheel and brake assembly wherein a solid wheel disc serves to support the rim about the hub and also provides the braking surface. One or preferably two brake calipers are mounted inwardly of the rim. In the preferred embodiment, the wheel disc is constructed from component halves, each in turn having a construction similar to the aforementioned clad brake rotor, with an aluminum body covered with a sheet of steel to form an integral disc surface. Also in the preferred embodiment, the wheel is constructed by fastening together two disc halves and a hollow space is provided therebetween. Holes may be provided in both halves in the area near the hub and near the brake surface to create a turbine-like cooling effect as air enters the open space adjacent the hub and is expelled through the holes nearer the brake.

DESCRIPTION OF THE PREFERRED EMBODIMENT

Figure 1:
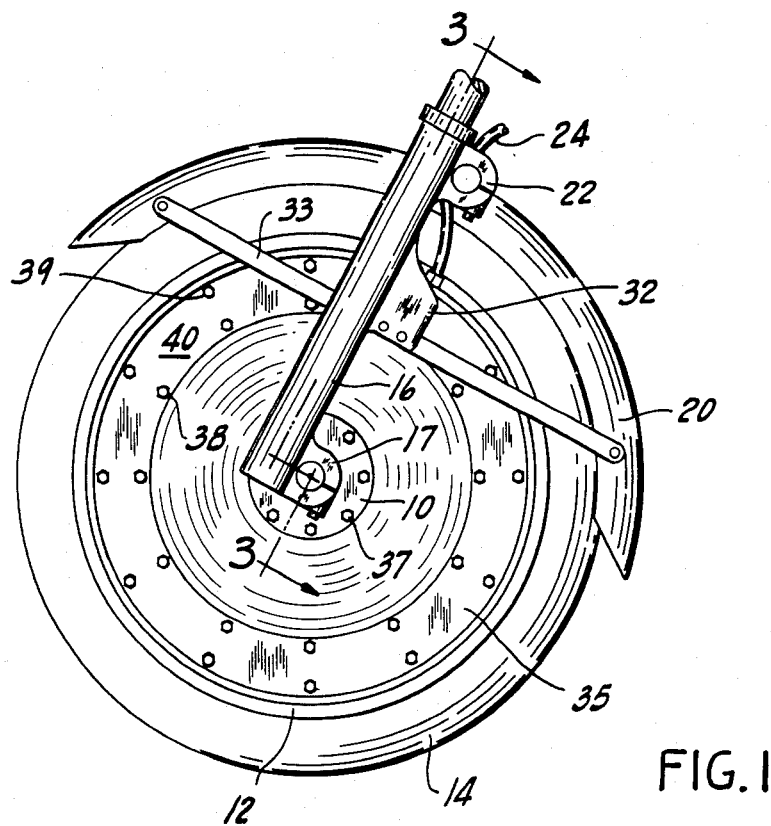
FIG. 1 is a side elevation view of one preferred embodiment of the wheel and brake assembly of the present invention.

FIG. 1 shows one embodiment of the present invention in the form of a front wheel assembly for a motorcycle. The normal motorcycle front end components are shown generally and include a hub 10, a rim 12 with a tire 14 supported thereon. The front fork lower sliders 16 are coupled at their lower ends to the hub 10 through flange plates 17 mounted on the rear thereof. A fender 20 is mounted on the sliders 16 and a support clamp 22 is provided on the rear of the sliders. Clamp 22 also holds the hydraulic hose 24 of a standard hydraulic brake system not shown. The clamp 22 acts in concert with the wheel axle to prevent bending of the fork when the brakes are applied. In this embodiment, the brake calipers 32 are also located on the rear of the fork slider legs, a position which is advantageous because torque created by brake application is balanced by the frictional force torque about the fork slider axes. Brake calipers 32 are located generally adjacent rim 12. A pair of brace bars 33 are also shown. It should be appreciated that another caliper 32 is provided on the opposite side of the wheel assembly as will be more fully illustrated hereafter.

Figure 3:
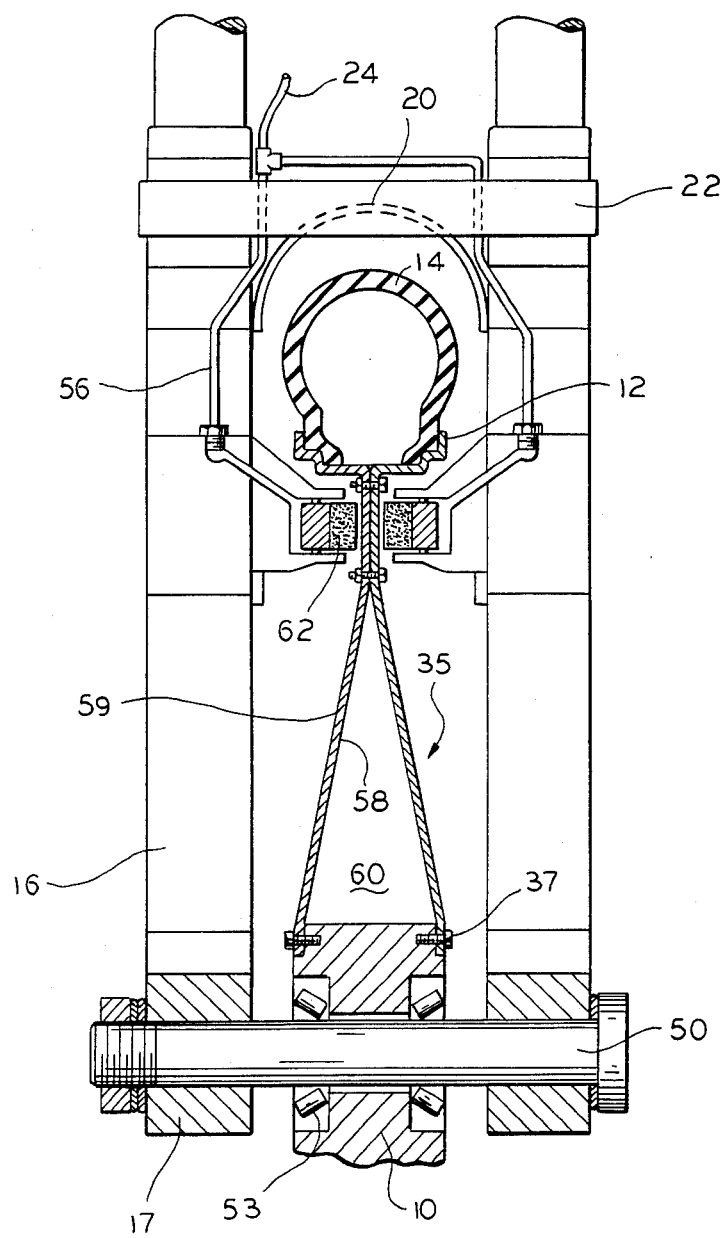
FIG. 3 is a sectional view taken along the line 3—3 of FIG. 1.

As will be more apparent in a subsequent description of FIG. 3, the wheel assembly also includes a pair of wheel discs 35 which extend from the hub 10 to rim 12. The discs 35 may be formed from a single piece or comprise separate disc halves. The discs are attached to the hub by bolts 37 and are also attached to one another in the vicinity of the rim by bolts 38 and 39, the latter being arranged around the discs and radially spaced apart from one another by a space 40. Space 40 provides the braking surface for the calipers 32. While bolts have been illustrated as the method of attaching the disc halves, other attachment means may be used, such as rivets, welding, etc.

Figure 2:
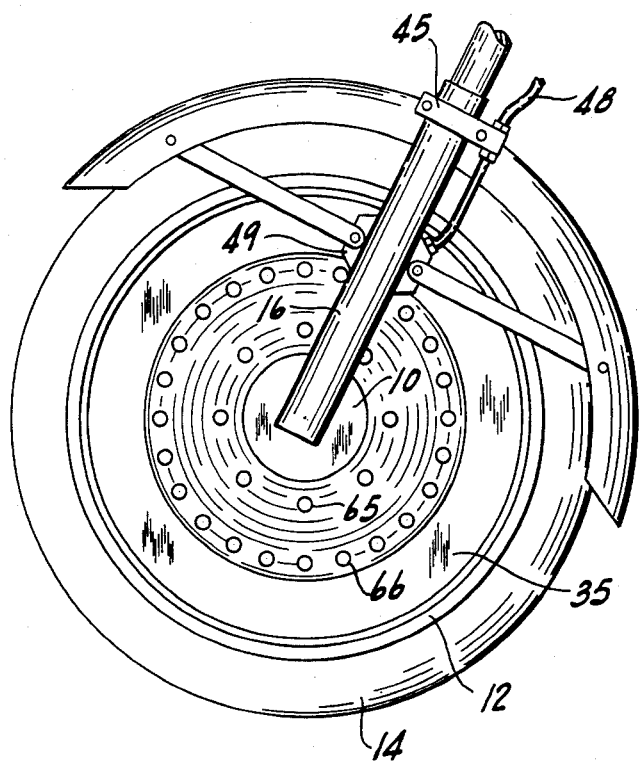
FIG. 2 is a side elevation view of another embodiment of the present invention illustrating another method of attaching the brake calipers and clamps and an alternate form of disc configuration.

Another embodiment of the invention is shown in FIG. 2, with the discs 35 shown to be welded rather than bolted together. A clamping brace 45 is shown above the wheel and connecting the fork lower sliders. A brake hose 48 is also shown in FIG. 2 which is coupled to the remaining components of the braking system (not shown) and to caliper 49.

FIG. 3 shows in sectional view the major components of the wheel assembly of the present invention as illustrated in FIG. 1. An axle 50 couples the lower ends of the fork sliders 16 and supports the hub 10 as is known to the art. The hub 10 in turn is supported for rotation about the axle by suitable bearing 53. As can be clearly noted in this FIGURE, bolts 37 secure the wheel discs 35 to hub 10. Other features shown in this FIGURE include the clamping brace 22, fender 20, rim 12, tire 14, brake hose 24 and conventional brake lines 56.

The disc 35 is comprised of symmetrical halves each comprising an inner layer 58 of aluminum and an outer skin 59 of stainless steel. Each half includes a central frusto-conical shaped portion, a flat portion defining the braking surface 40 and an expanded section at its periphery which defines one half of the tire rim. By way of example and not by limitation, the skin 59 is preferably about 5-10% of the total thickness of the wheel half but should not be less than about 20 thousands of an inch thick. The stainless steel employed should be one which is relatively hard and resistant to abrasion such as 304 stainless.

The aluminum layer 58 should be fabricated from an aluminum alloy having high strength and should preferably be hardenable. Satisfactory materials include alloys such as 2024T-6 and 6061T-6. Furthermore, it is generally advantageous to employ a thin layer of substantially pure aluminum, such as 1145, over the aluminum alloy, the stainless steel then being laminated thereto by a process of oxide removal, heating and rolling. The latter process is generally described in Ulam's U.S. Pat. Nos. 3,210,840 and 3,261,724, the disclosures of which are expressly incorporated herein by this reference. It has been found that the alloy-aluminum-steel fabrication is most desirable. The wheel sides can be fabricated by any known technique such as stamping, pressing, etc. and are then joined to each others by the methods previously described.

It can further be noted in FIG. 3 that an air space 60 is created by the frusto-conical portions of the disc halves and that the halves converge inwardly from the hub to the brake area 40. Air space 60 may be used to assist in cooling as will soon be described.

The brake caliper includes brake pads 62 of suitable friction material mounted to the brake pistons as is known in the brake art. Pads 62 are applied to the area of discs 35 between bolts 38 and 39 or in the flat and vertical area of the wheel disc. This area is slightly wider than the width of pads 62 but is of a considerably greater area than is typically encountered in vehicle brakes because space 40 extends all the way around the wheel.

Another feature of the invention is shown in FIG. 2 where it is shown that the wheel disc assembly includes a plurality of holes 65 in the vicinity of hub 10 opening to the air space 60 and that a further plurality of holes 66 are provided in the area of the assembly nearer the braking surface 40 and also entering the air space 60. The numbers of holes and the pattern of hole formation is not critical to the invention.

As the disc wheel assembly is rotated, an air flow is established with air entering the air space 60 through holes 65 and leaving through holes 66. This turbine-like air flow blowing across the braking surface assists in cooling the brakes. It should also be apparent that this modificaion of the present invention has applicability to the bolted embodiment of FIGS. 1 and 3 as well as to the welded construction shown in FIG. 2.

While the present invention has been described in connection with one preferred embodiment and an alternate embodiment, the features of the invention may be variously embodied. For example, the wheel brake assembly may be employed which vehicles such as bicycles, planes, automobiles and the like. Other metals, alloys or composite plastics may also be used for constructing the wheel disc brake assembly and a variety of techniques for fabricating and joining the disc halves may be employed. Therefore, the scope of the present invention is not to be limited by the foregoing description but is to be limited solely by the claims which follow.

I claim:

1. A vehicle wheel and brake assembly comprising a hub, a rim for supporting a tire, a tire supported by said rim, a disc intermediate said hub and said rim and connecting same, an air space in said disc adjacent said hub, friction brake means constructed and arranged to selectively engage said disc at an area near said rim to apply braking forces thereto, said disc comprising two symmetrical disc halves which converge toward one another and contact one another in said area rear said rim.

2. The invention set forth in claim 1 wherein each of said disc halves includes a plurality of holes therethrough opening to said air space.

3. The invention set forth in claim 2 wherein said plurality of holes are divided into two groups, a first one of said groups being generally adjacent said hub and the second one of said groups being radially spaced apart therefrom and located interiorly of and adjacent the area where braking forces are applied to said disc.

4. In a vehicle wheel and brake assembly of the type which includes a hub mounted for rotation on an axle and a flanged tire supporting rim, the improvement comprising a pair of discs coupling said rim to said hub, each of said discs comprising circular disc halves which are secured to said hub and are spaced apart from one another by an air space near said hub, said disc halves converging toward one another as the radial distance from said hub increases and wherein said disc halves contact one another adjacent said rim to form an annular portion, said portion lying in a plane which is perpendicular to the axis of said axle; and brake means for engaging each of said disc halves on said annular portion.

5. The invention set forth in claim 4 wherein said rim is formed by said disc halves.

6. The invention set forth in either claim 4 or claim 5 wherein said halves are coupled together by a fastening technique selected from the group consisting of bolting, welding or rivoting.

7. The invention set forth in claim 4 wherein a first plurality of holes are provided in each of said disc halves in the vicinity of said hub and a second plurality of holes are provided in each of said disc halves in the vicinity of but inwardly of said annular portion, whereby air is circulated through said air space as said wheel and brake assembly is rotated.

* * * * *